(12) United States Patent
Fujimura et al.

(10) Patent No.: US 11,973,369 B2
(45) Date of Patent: Apr. 30, 2024

(54) LAMINATED CORE WITH CENTER ELECTRICAL STEEL SHEETS ADHERED WITH ADHESIVE AND SOME ELECTRICAL STEEL SHEETS FIXED TO EACH OTHER ON BOTH ENDS OF THE CENTER SHEETS

(71) Applicant: NIPPON STEEL CORPORATION, Tokyo (JP)

(72) Inventors: Hiroshi Fujimura, Tokyo (JP); Takeaki Wakisaka, Tokyo (JP); Ryu Hirayama, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 214 days.

(21) Appl. No.: 17/292,762

(22) PCT Filed: Dec. 17, 2019

(86) PCT No.: PCT/JP2019/049260
§ 371 (c)(1),
(2) Date: May 11, 2021

(87) PCT Pub. No.: WO2020/129923
PCT Pub. Date: Jun. 25, 2020

(65) Prior Publication Data
US 2021/0399594 A1    Dec. 23, 2021

(30) Foreign Application Priority Data
Dec. 17, 2018   (JP) .................................. 2018-235851

(51) Int. Cl.
*H02K 1/14*    (2006.01)
*H02K 1/16*    (2006.01)

(52) U.S. Cl.
CPC .............. *H02K 1/146* (2013.01); *H02K 1/16* (2013.01); *H02K 2201/09* (2013.01); *H02K 2213/03* (2013.01)

(58) Field of Classification Search
CPC ............ H02K 1/14; H02K 1/146; H02K 1/16; H02K 1/08; H02K 1/06; H02K 1/185;
(Continued)

(56) References Cited

U.S. PATENT DOCUMENTS

| 3,386,058 A | 5/1968 | Michel |
| 4,025,379 A | 5/1977 | Whetstone |

(Continued)

FOREIGN PATENT DOCUMENTS

| CN | 102792556 A | 11/2012 |
| EP | 3553799 A1 | 10/2019 |

(Continued)

OTHER PUBLICATIONS

Matweb, "Plaskolite West Optix® CA—41 FDA General Purpose Acrylic Resin", 2 pages, retrieved online Dec. 19, 2022, www.matweb.com/search/DataSheet.aspx?MatGUID=ceec51c04f714fb383d01496424432d9. (Year: 2022).

(Continued)

*Primary Examiner* — Maged M Almawri
(74) *Attorney, Agent, or Firm* — Renner, Otto, Boisselle & Sklar, LLP (57) ABSTRACT

A laminated core includes a plurality of electrical steel sheets stacked on each other, wherein, among the plurality of electrical steel sheets, both of the electrical steel sheets located on a first side in a stacking direction and the electrical steel sheets located on a second side in the stacking direction are fastened to each other but are not adhered to (Continued)

each other, and the electrical steel sheets located in a center in the stacking direction are adhered to each other but are not fastened to each other.

8 Claims, 7 Drawing Sheets

(58) Field of Classification Search
CPC ........ H02K 1/12; H02K 15/02; H02K 15/022; H02K 15/026; H02K 2201/09; H02K 2213/03; H01F 27/246; H01F 41/02; B32B 15/011; C09J 133/04; C09J 133/08; C09J 2203/326
USPC ....... 310/216.004, 216.011–216.19, 216.059, 310/216.061, 216.062, 216.064, 216.065, 310/216.071, 216.073, 216.092, 216.096
See application file for complete search history.

(56) References Cited

U.S. PATENT DOCUMENTS

| | | | | |
|---|---|---|---|---|
| 4,103,195 | A | 7/1978 | Torossian | |
| 4,316,111 | A * | 2/1982 | Merki | H02K 3/527 |
| | | | | 310/216.136 |
| 4,413,406 | A | 11/1983 | Bennett | |
| 5,142,178 | A * | 8/1992 | Kloster | H02K 1/26 |
| | | | | 310/216.048 |
| 5,248,405 | A | 9/1993 | Kaneda et al. | |
| 5,338,996 | A * | 8/1994 | Yamamoto | H02K 1/26 |
| | | | | 336/234 |
| 5,448,119 | A * | 9/1995 | Kono | H02K 7/14 |
| | | | | 310/90 |
| 5,783,893 | A * | 7/1998 | Dade | H02K 16/00 |
| | | | | 310/266 |
| 5,994,464 | A | 11/1999 | Ohsawa et al. | |
| 6,495,936 | B2 * | 12/2002 | Kikuchi | H02K 9/197 |
| | | | | 310/58 |
| 6,653,758 | B2 * | 11/2003 | Tsuneyoshi | H02K 9/197 |
| | | | | 310/216.014 |
| 7,298,064 | B2 | 11/2007 | Yamamoto | |
| 7,562,439 | B2 | 7/2009 | Yamamoto | |
| 7,859,163 | B2 * | 12/2010 | Bertocchi | H01F 41/0233 |
| | | | | 310/216.048 |
| 7,952,254 | B2 * | 5/2011 | Cho | H02K 3/345 |
| | | | | 310/216.118 |
| 8,015,691 | B2 | 9/2011 | Miyake | |
| 8,581,468 | B2 * | 11/2013 | Kudose | H02K 1/16 |
| | | | | 310/216.049 |
| 8,697,811 | B2 | 4/2014 | Kishi et al. | |
| 8,887,376 | B2 * | 11/2014 | Gerster | H01F 41/024 |
| | | | | 29/598 |
| 9,124,161 | B2 * | 9/2015 | Kim | H02K 1/278 |
| 9,331,530 | B2 * | 5/2016 | Jang | H02K 1/146 |
| 9,512,335 | B2 | 12/2016 | Hoshi et al. | |
| 9,770,949 | B2 | 9/2017 | Fudemoto et al. | |
| 10,340,754 | B2 | 7/2019 | Ogino et al. | |
| 10,348,170 | B2 * | 7/2019 | Izumi | H02K 15/024 |
| 10,476,321 | B2 * | 11/2019 | Li | H02K 15/026 |
| 10,491,059 | B2 * | 11/2019 | Murakami | H02K 1/185 |
| 10,547,225 | B2 * | 1/2020 | Hattori | H02K 1/185 |
| 10,574,112 | B2 * | 2/2020 | Tomonaga | H02K 1/02 |
| 10,819,201 | B2 * | 10/2020 | Thumm | H02K 17/165 |
| 10,840,749 | B2 * | 11/2020 | Chaillou | H02K 15/085 |
| 11,056,934 | B2 * | 7/2021 | Kubota | H02K 1/165 |
| 11,261,513 | B2 * | 3/2022 | Volbers | H01F 1/16 |
| 11,616,407 | B2 * | 3/2023 | Hino | H02K 1/165 |
| | | | | 310/216.007 |
| 11,705,625 | B2 * | 7/2023 | Tezuka | H01Q 1/48 |
| | | | | 343/700 R |
| 2002/0047459 | A1 | 4/2002 | Adaeda | H02K 21/222 |
| | | | | 310/216.048 |
| 2002/0145359 | A1 * | 10/2002 | Nishiyama | H02K 15/022 |
| | | | | 310/216.065 |
| 2002/0163277 | A1 * | 11/2002 | Miyake | H02K 15/022 |
| | | | | 310/216.001 |
| 2002/0175586 | A1 * | 11/2002 | Hill | H02K 19/103 |
| | | | | 310/179 |
| 2004/0056556 | A1 * | 3/2004 | Fujita | H02K 1/06 |
| | | | | 29/609 |
| 2004/0108781 | A1 * | 6/2004 | Razzell | H02K 51/00 |
| | | | | 310/112 |
| 2004/0124733 | A1 * | 7/2004 | Yamamoto | H02K 3/522 |
| | | | | 29/596 |
| 2006/0043820 | A1 | 3/2006 | Nakahara | |
| 2007/0024148 | A1 * | 2/2007 | Maita | H02K 23/405 |
| | | | | 310/216.011 |
| 2007/0040467 | A1 * | 2/2007 | Gu | H02K 3/522 |
| | | | | 310/260 |
| 2007/0182268 | A1 * | 8/2007 | Hashiba | H02K 1/146 |
| | | | | 310/67 R |
| 2009/0026873 | A1 * | 1/2009 | Matsuo | H02K 15/022 |
| | | | | 310/216.019 |
| 2009/0195110 | A1 | 8/2009 | Miyaki | |
| 2009/0230812 | A1 * | 9/2009 | Cho | H02K 3/325 |
| | | | | 310/216.118 |
| 2010/0045120 | A1 * | 2/2010 | Kitano | B22F 1/102 |
| | | | | 252/62.51 R |
| 2010/0090560 | A1 | 4/2010 | Myojin | |
| 2010/0197830 | A1 | 8/2010 | Hayakawa et al. | |
| 2010/0219714 | A1 * | 9/2010 | Abe | H02K 1/146 |
| | | | | 310/216.048 |
| 2010/0244617 | A1 * | 9/2010 | Nobata | H02K 3/50 |
| | | | | 310/216.069 |
| 2011/0037338 | A1 * | 2/2011 | Leiber | H02K 15/022 |
| | | | | 310/216.105 |
| 2011/0180216 | A1 | 7/2011 | Miyake | |
| 2011/0269894 | A1 | 11/2011 | Miyamoto | |
| 2011/0316366 | A1 * | 12/2011 | Abbasian | H02K 19/103 |
| | | | | 310/46 |
| 2012/0088096 | A1 | 4/2012 | Takeda et al. | |
| 2012/0128926 | A1 | 5/2012 | Ohishi et al. | |
| 2012/0156441 | A1 | 6/2012 | Gerster | |
| 2012/0235535 | A1 | 9/2012 | Watanabe | |
| 2012/0288659 | A1 | 11/2012 | Hoshi et al. | |
| 2013/0244029 | A1 | 9/2013 | Igarashi et al. | |
| 2014/0023825 | A1 | 1/2014 | Igarashi et al. | |
| 2014/0070999 | A1 * | 3/2014 | Kaneda | H01L 24/14 |
| | | | | 257/E21.705 |
| 2014/0084742 | A1 * | 3/2014 | Gudewer | H02K 1/08 |
| | | | | 310/216.091 |
| 2014/0167894 | A1 * | 6/2014 | Jajtic | H02K 1/02 |
| | | | | 335/297 |
| 2014/0217859 | A1 * | 8/2014 | Saito | H02K 1/276 |
| | | | | 310/68 D |
| 2015/0028717 | A1 | 1/2015 | Luo et al. | |
| 2015/0097463 | A1 | 4/2015 | Blocher et al. | |
| 2015/0130318 | A1 | 5/2015 | Kitada et al. | |
| 2015/0256037 | A1 * | 9/2015 | Kudose | H02K 3/30 |
| | | | | 310/45 |
| 2015/0337106 | A1 | 11/2015 | Kajihara | |
| 2016/0023447 | A1 * | 1/2016 | Shimizu | H02K 15/02 |
| | | | | 156/247 |
| 2016/0352159 | A1 * | 12/2016 | Li | H02K 1/146 |
| 2016/0352165 | A1 * | 12/2016 | Fubuki | H02K 1/22 |
| 2017/0117758 | A1 | 4/2017 | Nakagawa | |
| 2017/0287625 | A1 | 10/2017 | Ito | |
| 2017/0342519 | A1 | 11/2017 | Uesaka et al. | |
| 2017/0346351 | A1 * | 11/2017 | Volbers | H02K 1/02 |
| 2018/0026501 | A1 * | 1/2018 | Ogikubo | H02K 15/022 |
| | | | | 29/596 |
| 2018/0030292 | A1 | 2/2018 | Gotou | |
| 2018/0056629 | A1 * | 3/2018 | Hamamura | H02K 15/024 |
| 2018/0159389 | A1 | 6/2018 | Nishikawa | |
| 2018/0166951 | A1 * | 6/2018 | Ronning | H02K 3/18 |
| 2018/0212482 | A1 * | 7/2018 | Nigo | H02K 1/18 |
| 2018/0295678 | A1 | 10/2018 | Okazaki et al. | |
| 2018/0309330 | A1 | 10/2018 | Ueda | |
| 2018/0342925 | A1 | 11/2018 | Horii et al. | |
| 2019/0010361 | A1 | 1/2019 | Hoshi | |
| 2019/0040183 | A1 | 2/2019 | Yoshida et al. | |

(56) References Cited

U.S. PATENT DOCUMENTS

| | | | |
|---|---|---|---|
| 2019/0181731 A1* | 6/2019 | Yoshinaga | H02K 1/02 |
| 2020/0048499 A1 | 2/2020 | Andou et al. | |
| 2020/0099263 A1 | 3/2020 | Hirosawa et al. | |
| 2020/0112210 A1* | 4/2020 | Zhu | H02K 1/2766 |
| 2020/0161944 A1* | 5/2020 | Das | H02K 15/022 |
| 2020/0186014 A1* | 6/2020 | Kusuyama | B32B 37/12 |
| 2020/0381962 A1* | 12/2020 | Georgiou | H02K 1/16 |
| 2021/0091611 A1* | 3/2021 | Volbers | H02K 3/18 |
| 2021/0296975 A1* | 9/2021 | Hino | H01F 41/0233 |
| 2021/0351658 A1* | 11/2021 | Jore | H02K 5/203 |
| 2021/0399594 A1* | 12/2021 | Fujimura | H02K 1/06 |
| 2022/0028608 A1* | 1/2022 | Kamikawabata | H01F 41/0233 |
| 2022/0045582 A1* | 2/2022 | Hunstable | H02K 15/08 |

FOREIGN PATENT DOCUMENTS

| | | |
|---|---|---|
| EP | 3562006 A | 10/2019 |
| FR | 2803126 A1 | 6/2001 |
| JP | 56-065326 A | 6/1981 |
| JP | 57-006427 A | 1/1982 |
| JP | 60-170681 A | 9/1985 |
| JP | 60-186834 A | 12/1985 |
| JP | 60-186834 U | 12/1985 |
| JP | 63-207639 A | 8/1988 |
| JP | 03-124247 A | 5/1991 |
| JP | 03-247683 A | 11/1991 |
| JP | 04-028743 A | 3/1992 |
| JP | 04-028743 U | 3/1992 |
| JP | 07-118620 A | 5/1995 |
| JP | 07-298567 A | 11/1995 |
| JP | 08-259899 A | 10/1996 |
| JP | 11-162724 A | 6/1999 |
| JP | 2000-050539 A | 2/2000 |
| JP | 2000-152570 A | 5/2000 |
| JP | 2001-115125 A | 4/2001 |
| JP | 2002-078257 A | 3/2002 |
| JP | 2002-088107 A | 3/2002 |
| JP | 2002-105283 A | 4/2002 |
| JP | 2002-125341 A | 4/2002 |
| JP | 2002-151335 A | 5/2002 |
| JP | 2002-151339 A | 5/2002 |
| JP | 2002-164224 A | 6/2002 |
| JP | 2002-332320 A | 11/2002 |
| JP | 2003-199303 A | 7/2003 |
| JP | 2003-206464 A | 7/2003 |
| JP | 2003-219585 A | 7/2003 |
| JP | 2003-264962 A | 9/2003 |
| JP | 2003284274 A | 10/2003 |
| JP | 2004-088970 A | 3/2004 |
| JP | 2004-111509 A | 4/2004 |
| JP | 2004-150859 A | 5/2004 |
| JP | 2005-019642 A | 1/2005 |
| JP | 2005-268589 A | 9/2005 |
| JP | 2005-269732 A | 9/2005 |
| JP | 2006-254530 A | 9/2006 |
| JP | 2006-288114 A | 10/2006 |
| JP | 2006-353001 A | 12/2006 |
| JP | 2007015302 A | 1/2007 |
| JP | 2007-039721 A | 2/2007 |
| JP | 2008-067459 A | 3/2008 |
| JP | 4143090 B | 9/2008 |
| JP | 2009072035 A | 4/2009 |
| JP | 2009-177895 A | 8/2009 |
| JP | 2010-004716 A | 1/2010 |
| JP | 2010081659 A | 4/2010 |
| JP | 2010-220324 A | 9/2010 |
| JP | 2010-259158 A | 11/2010 |
| JP | 2011-023523 A | 2/2011 |
| JP | 2011-195735 A | 10/2011 |
| JP | 2012029494 A | 2/2012 |
| JP | 2012-061820 A | 3/2012 |
| JP | 2012060773 A | 3/2012 |
| JP | 2012-120299 A | 6/2012 |
| JP | 2012196100 A | 10/2012 |
| JP | 2013-089883 A | 5/2013 |
| JP | 2013-181101 A | 9/2013 |
| JP | 2013-253153 A | 12/2013 |
| JP | 2014-096429 A | 5/2014 |
| JP | 2014-155347 A | 8/2014 |
| JP | 2015-012756 A | 1/2015 |
| JP | 2015-082848 A | 4/2015 |
| JP | 2015-136228 A | 7/2015 |
| JP | 2015-142453 A | 8/2015 |
| JP | 2015-164389 A | 9/2015 |
| JP | 2015-171202 A | 9/2015 |
| JP | 2016-025317 A | 2/2016 |
| JP | 2016-046969 A | 4/2016 |
| JP | 2016-073109 A | 5/2016 |
| JP | 2016-140134 A | 8/2016 |
| JP | 2016-171652 A | 9/2016 |
| JP | 2016167907 A | 9/2016 |
| JP | 2017-005906 A | 1/2017 |
| JP | 2017-011863 A | 1/2017 |
| JP | 2017-028911 A | 2/2017 |
| JP | 2017-046442 A | 3/2017 |
| JP | 2017-075279 A | 4/2017 |
| JP | 2017-218596 A | 12/2017 |
| JP | 2018-038119 A | 3/2018 |
| JP | 2018-061319 A | 4/2018 |
| JP | 2018-078691 A | 5/2018 |
| JP | 2018-083930 A | 5/2018 |
| JP | 2018-093704 A | 6/2018 |
| JP | 2018-107852 A | 7/2018 |
| JP | 2018/138634 A | 9/2018 |
| JP | 2018-145492 A | 9/2018 |
| KR | 10-2018-0110157 A | 10/2018 |
| TW | 201809023 A | 3/2018 |
| WO | 2010/082482 A1 | 7/2010 |
| WO | 2011/013691 A1 | 2/2011 |
| WO | 2011/054065 A2 | 5/2011 |
| WO | 2014/102915 A1 | 7/2014 |
| WO | 2016017132 A1 | 2/2016 |
| WO | 2017/033229 A1 | 3/2017 |
| WO | 2017104479 A1 | 6/2017 |
| WO | 2017/170957 A | 10/2017 |
| WO | 2017/199527 A1 | 11/2017 |
| WO | 2018/043429 A1 | 3/2018 |
| WO | 2018/093130 A1 | 5/2018 |
| WO | 2018/105473 A1 | 6/2018 |
| WO | 2018/138864 A1 | 8/2018 |
| WO | 2018/207277 A1 | 11/2018 |
| WO | 2018/216565 A1 | 11/2018 |
| WO | 2020/129921 A1 | 6/2020 |
| WO | 2020/129924 A1 | 6/2020 |
| WO | 2020/129925 A1 | 6/2020 |
| WO | 2020/129926 A1 | 6/2020 |
| WO | 2020/129927 A1 | 6/2020 |
| WO | 2020/129928 A1 | 6/2020 |
| WO | 2020/129929 A1 | 6/2020 |
| WO | 2020/129935 A1 | 6/2020 |
| WO | 2020/129936 A1 | 6/2020 |
| WO | 2020/129937 A1 | 6/2020 |
| WO | 2020/129938 A1 | 6/2020 |
| WO | 2020/129940 A1 | 6/2020 |
| WO | 2020/129941 A1 | 6/2020 |
| WO | 2020/129942 A1 | 6/2020 |
| WO | 2020/129946 A1 | 6/2020 |
| WO | 2020/129948 A1 | 6/2020 |
| WO | 2020/129951 A1 | 6/2020 |

OTHER PUBLICATIONS

Japanese Industrial Standard (JIS) C 2552: 2014, relevance discussed in specification.
Japanese Industrial Standard (JIS) C 2553: 2012, relevance discussed in specification.
Japanese Industrial Standard (JIS) R 1602: 1995, relevance discussed in specification.
Japanese Industrial Standard (JIS) Z 2241: 2011.
Japanese Industrial Standard (JIS) K 7252-1:2016.
Japanese Industrial Standard (JIS) K 7121-1987.
Japanese Industrial Standard (JIS) K 6850: 1999.

(56) References Cited

OTHER PUBLICATIONS

The papers of technical meetings in the Institute of Electrical Engineers of Japan, RM-92-79, 1992.
Datasheet of Nylon 6, Cast (Year: N/A, Printed Jun. 28, 2023).

* cited by examiner

LAMINATED CORE WITH CENTER ELECTRICAL STEEL SHEETS ADHERED WITH ADHESIVE AND SOME ELECTRICAL STEEL SHEETS FIXED TO EACH OTHER ON BOTH ENDS OF THE CENTER SHEETS

TECHNICAL FIELD

The present invention relates to a laminated core and an electric motor.

Priority is claimed on Japanese Patent Application No. 2018-235851, filed Dec. 17, 2018, the content of which is incorporated herein by reference.

BACKGROUND ART

In the related art, a laminated core as described in Patent Document 1 below is known. In this laminated core, electrical steel sheets adjacent in a stacking direction are joined to each other by both methods of adhesion and fastening.

CITATION LIST

Patent Document

[Patent Document 1]
Japanese Unexamined Patent Application, First Publication No. 2015-136228

SUMMARY OF THE INVENTION

Problems to be Solved by the Invention

There is room for improvement in the magnetic properties of the laminated core of the related art while ensuring dimensional accuracy of an outer shape.

The present invention has been made in view of the above circumstances, and an object of the present invention is to improve the magnetic properties while ensuring dimensional accuracy of an outer shape.

Means for Solving the Problem

To solve the above problems, the present invention proposes the following means.
(1) A first aspect of the present invention is a laminated core that includes a plurality of electrical steel sheets stacked on each other, wherein, among the plurality of electrical steel sheets, both of the electrical steel sheets located on a first side in a stacking direction and the electrical steel sheets located on a second side in the stacking direction are fastened to each other but are not adhered to each other, and the electrical steel sheets located in a center in the stacking direction are adhered to each other but are not fastened to each other.

In a case of joining by fastening, it is possible to improve dimensional accuracy as compared with joining by adhesion. Here, among the plurality of electrical steel sheets, both of the electrical steel sheets located on the first side in a stacking direction and the electrical steel sheets located on the second side in the stacking direction are fastened to each other. Therefore, it is possible to improve the accuracy of the shape of each of portions located on the first side and the second side in the stacking direction (each of portions located outside in the stacking direction with respect to the center in the stacking direction) in the laminated core. Each of these portions has a large influence on the outer shape of the laminated core as compared with a portion located in the center of the stator core. Therefore, by increasing the accuracy of the shape of each of these portions, as a result, it is possible to improve the accuracy of the outer shape of the laminated core. Therefore, it is possible to ensure the handleability of the laminated core. For example, even in a case in which a winding is wound around the laminated core, it is possible to wind the winding with high accuracy and the like.

In a case of the joining by adhesion, it is possible to reduce a strain occurring in the electrical steel sheet as compared with in joining by fastening. Since a strain occurring in the electrical steel sheet affects the iron loss of the electrical steel sheet and the magnetic properties of the laminated core, the strain is preferably small. Here, among the plurality of electrical steel sheets, the electrical steel sheets located in the center in the stacking direction are adhered to each other. Therefore, it is possible to more suppress the occurrence of a strain as compared with the case in which these electrical steel sheets are fastened to each other. As a result, it is possible to improve the magnetic properties of the laminated core.

(2) In the laminated core according to (1), the number of the electrical steel sheets located in the center and adhered to each other may be larger than the number of the electrical steel sheets located on the first side and fastened to each other and the number of the electrical steel sheets located on the second side and fastened to each other.

The number (hereinafter referred to as N3) of the electrical steel sheets located in the center and adhered to each other is larger than the number (hereinafter referred to as N1) of the electrical steel sheets located on the first side and fastened to each other and the number (hereinafter referred to as N2) of the electrical steel sheets located on the second side and fastened to each other. Therefore, it is possible to reduce a proportion of the number of electrical steel sheets joined by fastening in the entire laminated core. As a result, it is possible to further improve the magnetic properties of the laminated core.

(3) In the laminated core according to (1) or (2), the number of the electrical steel sheets located on the first side and fastened to each other may be equal to the number of the electrical steel sheets located on the second side and fastened to each other.

N1 and N2 are equal. Therefore, it is possible to reduce a difference between the dimensional accuracy on the first side in the stacking direction and the dimensional accuracy on the second side in the stacking direction in the laminated core. Accordingly, it is possible to further ensure the handleability of the laminated core.

(4) In the laminated core according to any one of (1) to (3), each of the electrical steel sheets may include an annular core back part and a plurality of tooth parts that protrude from the core back part in a radial direction of the core back part and are disposed at intervals in a circumferential direction of the core hack part.

The laminated core is a stator core in which the core back part and the tooth parts are provided. Therefore, for example, when the winding is passed through a slot between the tooth parts adjacent in the circumferential direction, the above-mentioned operational effect of ensuring the handleability is significantly achieved. That is, when the dimensional accuracy of the slot is improved, it is possible to easily wind the winding around the tooth parts as designed. Accordingly, it is possible to increase the space factor of the winding in the slot. As a result, it is possible to increase the electrical load in the slot.

(5) In the laminated core according to any one of (1) to (4), an average thickness of the adhesion parts may be 1.0 μm to 3.0 μm.
(6) In the laminated core according to any one of (1) to (5), an average tensile modulus of elasticity E of the adhesion parts may be 1500 MPa to 4500 MPa.
(7) In the laminated core according to any one of (1) to (6), the adhesion part may be a room temperature adhesion type acrylic-based adhesive including SGA made of an elastomer-containing acrylic-based adhesive.
(8) A second aspect of the present invention is an electric motor comprising the laminated core according to any one of (1) to (7).

Effects of the Invention

According to the present invention, it is possible to improve the magnetic properties while ensuring dimensional accuracy of an outer shape.

EMBODIMENT(S) FOR IMPLEMENTING THE INVENTION

Hereinafter, an electric motor according to an embodiment of the present invention will be described with reference to the drawings. In the present embodiment, a motor, specifically, an AC motor, more specifically, a synchronous motor, and further more specifically, a permanent magnetic electric motor will be described as an example of the electric motor. This type of motor is suitably employed for, for example, an electric vehicle and the like.

Figure 1:
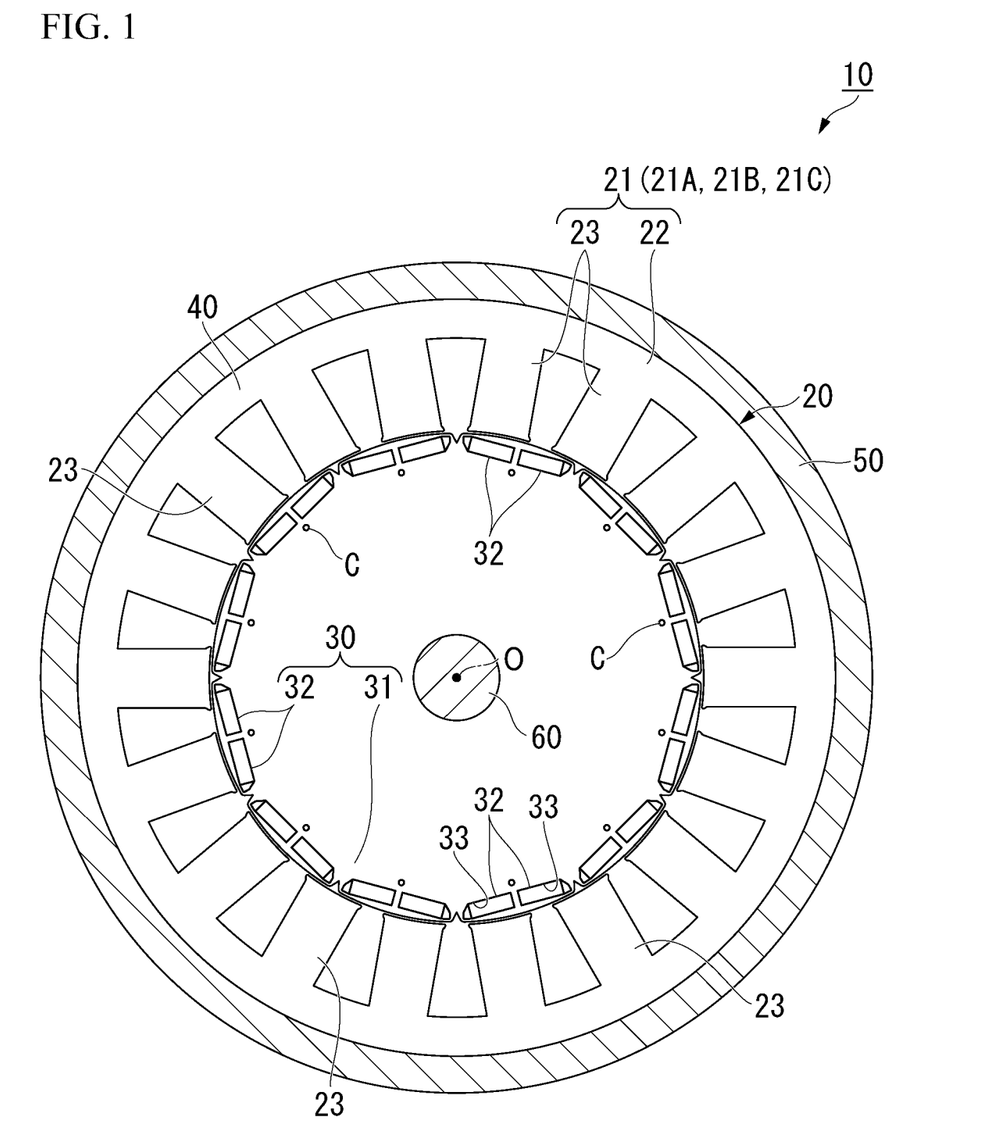
FIG. 1 is a cross-sectional view of an electric motor according to an embodiment of the present invention.
Figure 2:
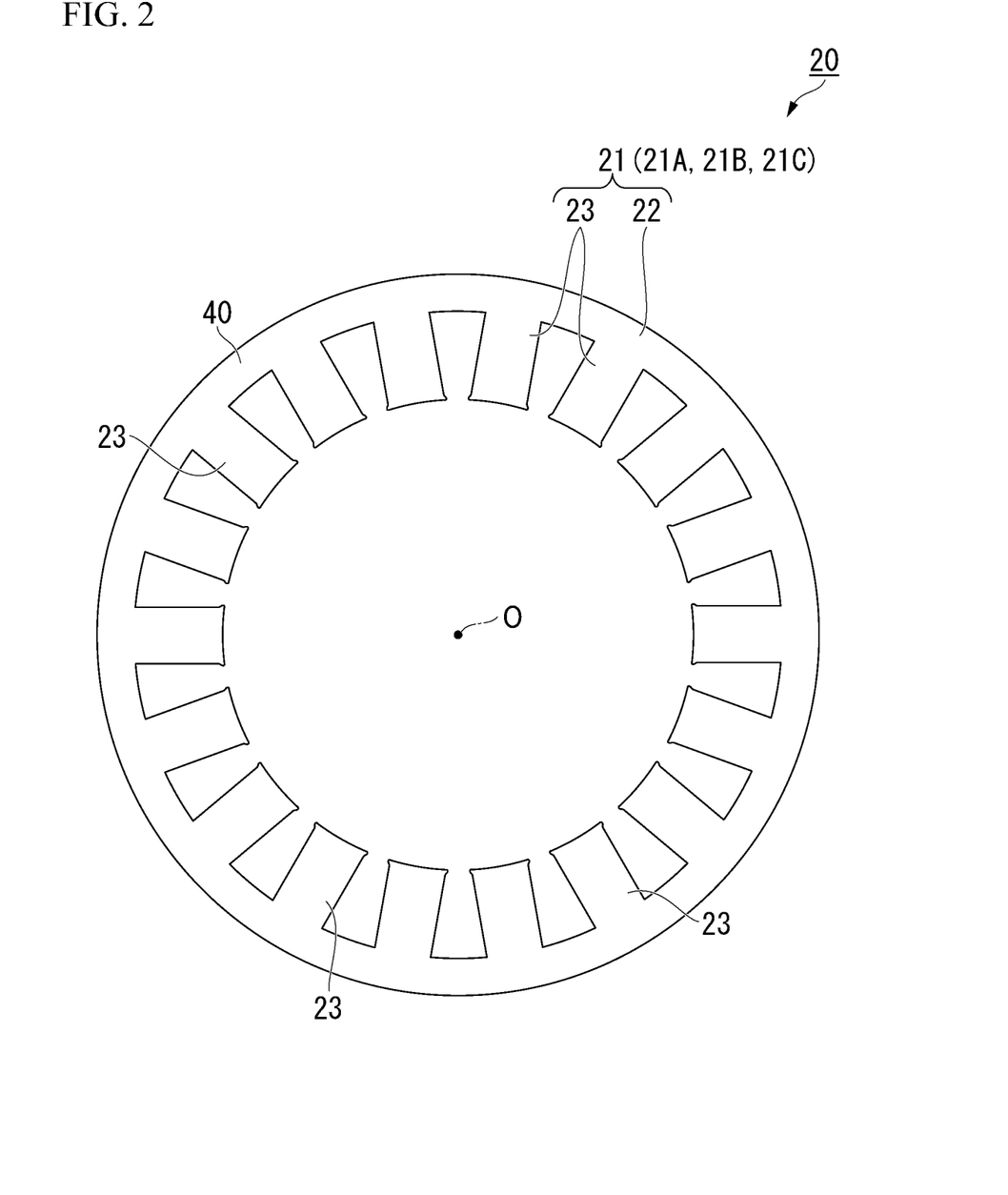
FIG. 2 is a plan view of a stator included in the electric motor shown in FIG. 1.

As shown in FIGS. 1 and 2, an electric motor 10 includes a stator 20, a rotor 30, a case 50, and a rotary shaft 60. The stator 20 and the rotor 30 are housed in the case 50. The stator 20 is fixed to the case 50.

In the present embodiment, as the electric motor 10, an inner rotor type electric motor in which the rotor 30 is located inside the stator 20 is employed. However, as the electric motor 10, an outer rotor type electric motor in which the rotor 30 is located outside the stator 20 may be employed. Further, in the present embodiment, the electric motor 10 is a three-phase AC motor with twelve poles and eighteen slots. However, for example, the number of poles, the number of slots, the number of phases, and the like can be appropriately changed. For example, when an excitation current having an effective value of 10 A and a frequency of 100 Hz is applied to each phase, the electric motor 10 can rotate at a rotation speed of 1000 rpm.

The stator 20 includes a stator core 21 and a winding (not shown).

The stator core 21 includes an annular core back part 22 and a plurality of tooth parts 23. Hereinafter, an axial direction of the stator core 21 (the core back part 22) (a direction of the central axis O of the stator core 21) is referred to as an axial direction, a radial direction of the stator core 21 (the core back part 22) (a direction orthogonal to the central axis O of the stator core 21) is referred to as a radial direction, and a circumferential direction of the stator core 21 (the core back part 22) (a direction of rotation around the central axis O of the stator core 21) are referred to as a circumferential direction.

The core back part 22 is formed in a circular shape in a plan view of the stator 20 in the axial direction.

The plurality of tooth parts 23 protrude inward from the core back part 22 in the radial direction (toward the central axis O of the core back part 22 in the radial direction). The plurality of tooth parts 23 are disposed at equal intervals in the circumferential direction. In the present embodiment, eighteen tooth parts 23 are provided every 20 degrees in terms of a central angle centered on the central axis O. The plurality of tooth parts 23 are formed to have the same shape and the same size. The shapes and sizes of the plurality of tooth parts 23 do not have to be the same.

The winding is wound around the tooth parts 23. The winding may be a concentrated winding or a distributed winding.

The rotor 30 is disposed inside the stator 20 (the stator core 21) in the radial direction. The rotor 30 includes a rotor core 31 and a plurality of permanent magnets 32.

The rotor core 31 is disposed coaxially with the stator 20 to form an annular shape (a circular shape). The rotary shaft 60 is disposed in the rotor core 31. The rotary shaft 60 is fixed to the rotor core 31.

The plurality of permanent magnets 32 are fixed to the rotor core 31. In the present embodiment, a set of two permanent magnets 32 form one magnetic pole. A plurality of sets of the permanent magnets 32 are disposed at equal intervals in the circumferential direction. In the present embodiment, twelve sets (twenty four in total) of the permanent magnets 32 are provided every 30 degrees in terms of a central angle centered on the central axis O. The intervals between the plurality of sets of permanent magnets 32 do not have to be the same.

In the present embodiment, as the permanent magnetic electric motor, an interior permanent magnet motor is employed. In the rotor core 31, a plurality of through holes 33 that penetrate the rotor core 31 in the axial direction are formed. The plurality of through holes 33 are provided corresponding to the plurality of permanent magnets 32. Each permanent magnet 32 is fixed to the rotor core 31 in a state of being disposed in the corresponding through hole 33. For example, an outer surface of the permanent magnet 32 and an inner surface of the through hole 33 are adhered to each other by an adhesive, and thus the fixing of each permanent magnet 32 to the rotor core 31 can be realized. As the permanent magnetic electric motor, a surface permanent magnet motor may be employed instead of the interior permanent magnet motor.

Each of the stator core 21 and the rotor core 31 is a laminated core. The laminated core is formed by a plurality of electrical steel sheets 40 being stacked.

The stacking thickness of each of the stator core 21 and the rotor core 31 is, for example, 50.0 mm. The outer diameter of the stator core 21 is, for example, 250.0 mm. The inner diameter of the stator core 21 is, for example, 165.0 mm. The outer diameter of the rotor core 31 is, for example, 163.0 mm. The inner diameter of the rotor core 31 is, for example, 30.0 mm. However, these values are examples, and the stacking thickness, the outer diameter, and the inner diameter of the stator core 21 and the stacking thickness, the outer diameter, and the inner diameter of the rotor core 31 are not limited to these values. Here, the inner diameter of the stator core 21 is based on a tip end of each of the tooth parts 23 of the stator core 21. The inner diameter of the stator core 21 is a diameter of a virtual circle inscribed in the tip ends of all of the tooth parts 23.

Each electrical steel sheet 40 for forming the stator core 21 and the rotor core 31 is formed, for example, by a punching process of an electrical steel sheet as a base material. A known electrical steel sheet can be used as the electrical steel sheet 40. The chemical composition of the electrical steel sheet 40 is not particularly limited. In the present embodiment, as the electrical steel sheet 40, a non-grain-oriented electrical steel sheet is employed. As the non-grain-oriented electrical steel sheet, for example, a JIS C 2552: 2014 non-grain-oriented electrical steel strip can be employed. However, as the electrical steel sheet 40, a grain-oriented electrical steel sheet can also be employed instead of a non-grain-oriented electrical steel sheet. As the grain-oriented electrical steel sheet, for example, a JIS C 2553: 2012 grain-oriented electrical steel strip can be employed.

An insulation coating is provided on each of both surfaces of the electrical steel sheet 40 to improve the workability of the electrical steel sheet and to reduce the iron loss of the laminated core. As the substance constituting the insulation coating, for example, (1) an inorganic compound, (2) an organic resin, (3) a mixture of an inorganic compound and an organic resin, and the like can be applied. Examples of the inorganic compound include (1) a complex of dichromate and boric acid, (2) a complex of phosphate and silica, and the like. Examples of the organic resin include epoxy-based resins, acrylic-based resins, acrylic-styrene-based resins, polyester-based resins, silicone-based resins, fluorine-based resins, and the like.

To ensure the insulation performance between the electrical steel sheets 40 stacked on each other, the thickness of the insulation coating (the thickness per one surface of the electrical steel sheet 40) is preferably 0.1 μm or more.

On the other hand, as the insulation coating becomes thicker, the insulation effect becomes saturated. Further, as the insulation coating becomes thicker, the space factor decreases, and a performance for serving as the laminated core deteriorates. Therefore, it is preferable to form the insulation coating as thin as possible in a range that the insulation performance can be ensured. The thickness of the insulation coating (the thickness per one surface of the electrical steel sheet 40) is preferably 0.1 μm or more and 5 μm or less, and more preferably 0.1 μm or more and 2 μm or less.

As the electrical steel sheet 40 becomes thinner, the effect of reducing the iron loss gradually becomes saturated. Further, as the electrical steel sheet 40 becomes thinner, the manufacturing cost of the electrical steel sheet 40 increases. Therefore, in consideration of the effect of reducing the iron loss and the manufacturing cost, the thickness of the electrical steel sheet 40 is preferably 0.10 mm or more.

On the other hand, if the electrical steel sheet 40 is too thick, a press punching operation of the electrical steel sheet 40 becomes difficult. Therefore, in consideration of the press punching operation of the electrical steel sheet 40, the thickness of the electrical steel sheet 40 is preferably 0.65 mm or less.

Further, as the electrical steel sheet 40 becomes thicker, the iron loss increases. Therefore, in consideration of the iron loss characteristics of the electrical steel sheet 40, the thickness of the electrical steel sheet 40 is preferably 0.35 mm or less, and more preferably 0.20 mm or 0.25 mm.

In consideration of the above points, the thickness of each electrical steel sheet 40 is, for example, 0.10 mm or more and 0.65 mm or less, preferably 0.10 mm or more and 0.35 mm or less, and more preferably 0.20 mm or 0.25 mm. The thickness of the electrical steel sheet 40 also includes the thickness of the insulation coating.

Some of the plurality of electrical steel sheets 40 for forming the stator core 21 are adhered to each other by an adhesion part 41. The adhesion part 41 is an adhesive that is provided between the electrical steel sheets 40 adjacent in the stacking direction and has cured without being divided. As the adhesive, for example, a thermosetting type adhesive by polymer bonding and the like are used. As a composition of the adhesive, (1) an acrylic-based resin, (2) an epoxy-based resin, (3) a composition containing an acrylic-based resin and an epoxy-based resin, and the like can be applied. As such an adhesive, in addition to the thermosetting type adhesive, a radical polymerization type adhesive and the like can also be used, and from the viewpoint of productivity, it is desirable to use a room temperature curing type adhesive. The room temperature curing type adhesive cures at 20° C. to 30° C. As the room temperature curing type adhesive, an acrylic-based adhesive is preferable. Typical acrylic-based adhesives include a second generation acrylic-based adhesive (SGA) and the like. Any one of an anaerobic adhesive, an instant adhesive, and an elastomer-containing acrylic-based adhesive can be used as long as the effects of the present invention are not impaired. The adhesive referred to here refers to an adhesive in a state before curing, and after the adhesive cures, it becomes the adhesion part 41.

An average tensile modulus of elasticity E of the adhesion parts 41 at room temperature (20° C. to 30° C.) is in the range of 1500 MPa to 4500 MPa. If the average tensile modulus of elasticity E of the adhesion parts 41 is less than 1500 MPa, a problem that the rigidity of the laminated core is lowered occurs. Therefore, a lower limit of the average tensile modulus of elasticity E of the adhesion parts 41 is 1500 MPa, and more preferably 1800 MPa. On the contrary, if the average tensile modulus of elasticity E of the adhesion parts 41 exceeds 4500 MPa, a problem that the insulation coating formed on a surface of the electrical steel sheet 40 is peeled off occurs. Therefore, an upper limit of the average tensile modulus of elasticity E of the adhesion parts 41 is 4500 MPa, and more preferably 3650 MPa.

The average tensile modulus of elasticity E is measured by a resonance method. Specifically, a tensile modulus of elasticity is measured in conformity with JIS R 1602: 1995.

More specifically, first, a sample for measurement (not shown) is made. This sample is obtained by adhering two electrical steel sheets 40 to each other by the adhesive to be measured and curing the adhesive to form the adhesion part 41. In a case in which the adhesive is a thermosetting type adhesive, this curing is performed by heating and pressurizing under healing and pressurizing conditions in actual operation. On the other hand, in a case in which the adhesive is a room temperature curing type adhesive, the curing is performed by pressurizing at room temperature.

Then, the tensile modulus of elasticity of this sample is measured by a resonance method. As described above, a method of measuring a tensile modulus of elasticity by the resonance method is performed in conformity with JIS R 1602: 1995. After that, the tensile modulus of elasticity of the adhesion part 41 alone is obtained by removing the influence of the electrical steel sheet 40 itself from the tensile modulus of elasticity (the measured value) of the sample by calculation.

The tensile modulus of elasticity thus obtained from the sample is equal to an average value for the laminated core as a whole, and thus this value is regarded as the average tensile modulus of elasticity E. The composition of the average tensile modulus of elasticity E is set such that the average tensile modulus of elasticity E hardly changes irrespective of a stacking position in the stacking direction and a circumferential position around the central axis of the laminated core. Therefore, a value obtained by measuring the tensile modulus of elasticity of the cured adhesion part 41 at an upper end position in the laminated core can be regarded as the average tensile modulus of elasticity E.

As an adhesion method, a method of applying an adhesive to the electrical steel sheets 40, and then adhering the electrical steel sheets 40 to each other by either one or both of heating and press-stacking can be employed. A heating means may be, for example, any means such as a method of heating in a high temperature bath or an electric furnace, a method of directly energizing, or the like.

To obtain stable and sufficient adhesion strength, the thickness of the adhesion part 41 is preferably 1 μm or more.

On the other hand, when the thickness of the adhesion part 41 exceeds 100 μm, an adhesion force becomes saturated. Further, as the adhesion part 41 becomes thicker, the space factor decreases, and the torque density formed when the laminated core is used for a motor decreases. Therefore, the thickness of the adhesion part 41 is preferably 1 μm or more and 100 μm or less, and more preferably 1 μm or more and 10 μm or less.

In the above, the thickness of the adhesion part 41 means an average thickness of the adhesion parts 41.

The average thickness of the adhesion parts 41 is more preferably 1.0 μm or more and 3.0 μm or less. If the average thickness of the adhesion parts 41 is less than 1.0 μm, a sufficient adhesion force cannot be secured as described above. Therefore, a lower limit of the average thickness of the adhesion parts 41 is 1.0 μm, and more preferably 1.2 μm. On the contrary, if the average thickness of the adhesion parts 41 becomes thicker than 3.0 μm, problems such as a large increase in a strain amount of the electrical steel sheet 40 due to shrinkage during thermosetting occur. Therefore, an upper limit of the average thickness of the adhesion parts 41 is 3.0 μm, and more preferably 2.6 μm.

The average thickness of the adhesion parts 41 is an average value for the laminated core as a whole. The average thickness of the adhesion parts 41 hardly changes irrespective of a stacking position in the stacking direction and a circumferential position around the central axis of the laminated core. Therefore, an average value of values obtained by measuring the thicknesses of the adhesion parts 41 at the upper end position in the laminated core at ten or more points in the circumferential direction can be regarded as the average thickness of the adhesion parts 41.

The average thickness of the adhesion parts 41 can be adjusted, for example, by changing the application amount of the adhesive. Further, for example, in a case of a thermosetting type adhesive, the average tensile modulus of elasticity E of the adhesion parts 41 can be adjusted by changing either one or both of heating and pressurizing conditions applied at the time of adhesion and the type of a curing agent.

In the present embodiment, the plurality of electrical steel sheets 40 for forming the rotor core 31 are fixed to each other by a fastening part C (a dowel). However, the plurality of electrical steel sheets 40 for forming the rotor core 31 may be adhered to each other by the adhesion part 41.

The laminated core such as the stator core 21 and the rotor core 31 may be formed by so-called the turn-stacking.

Figure 3:
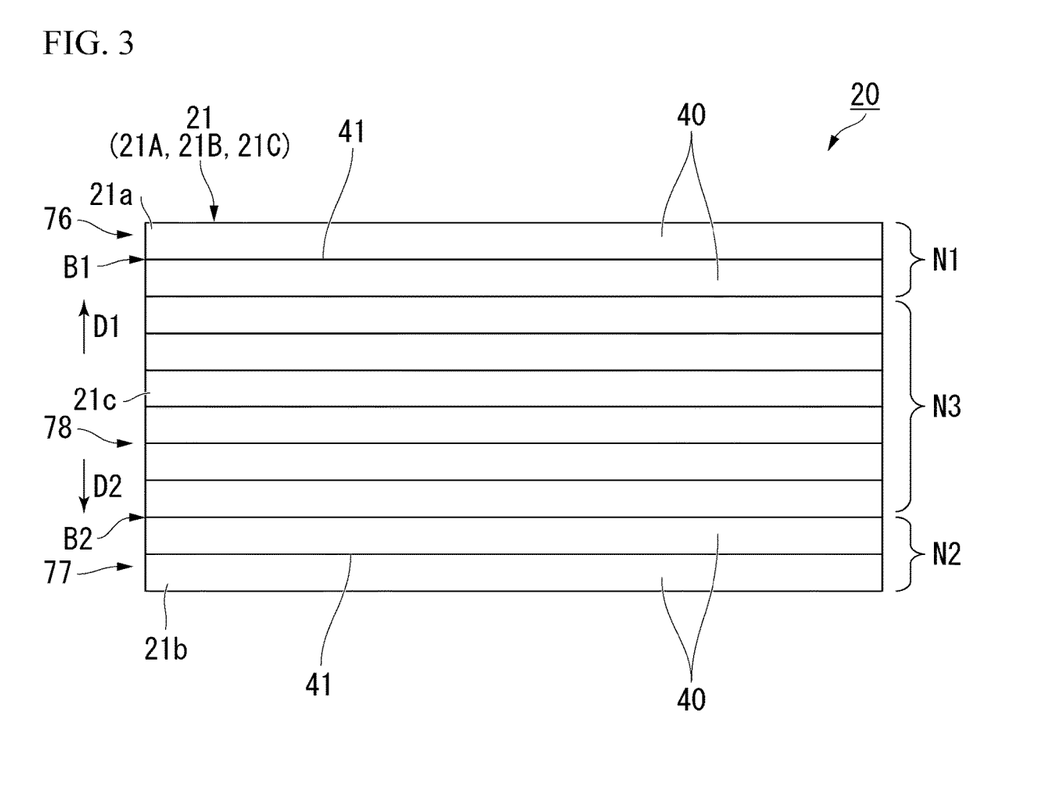
FIG. 3 is a side view of the stator included in the electric motor shown in FIG. 1.
Figure 4:
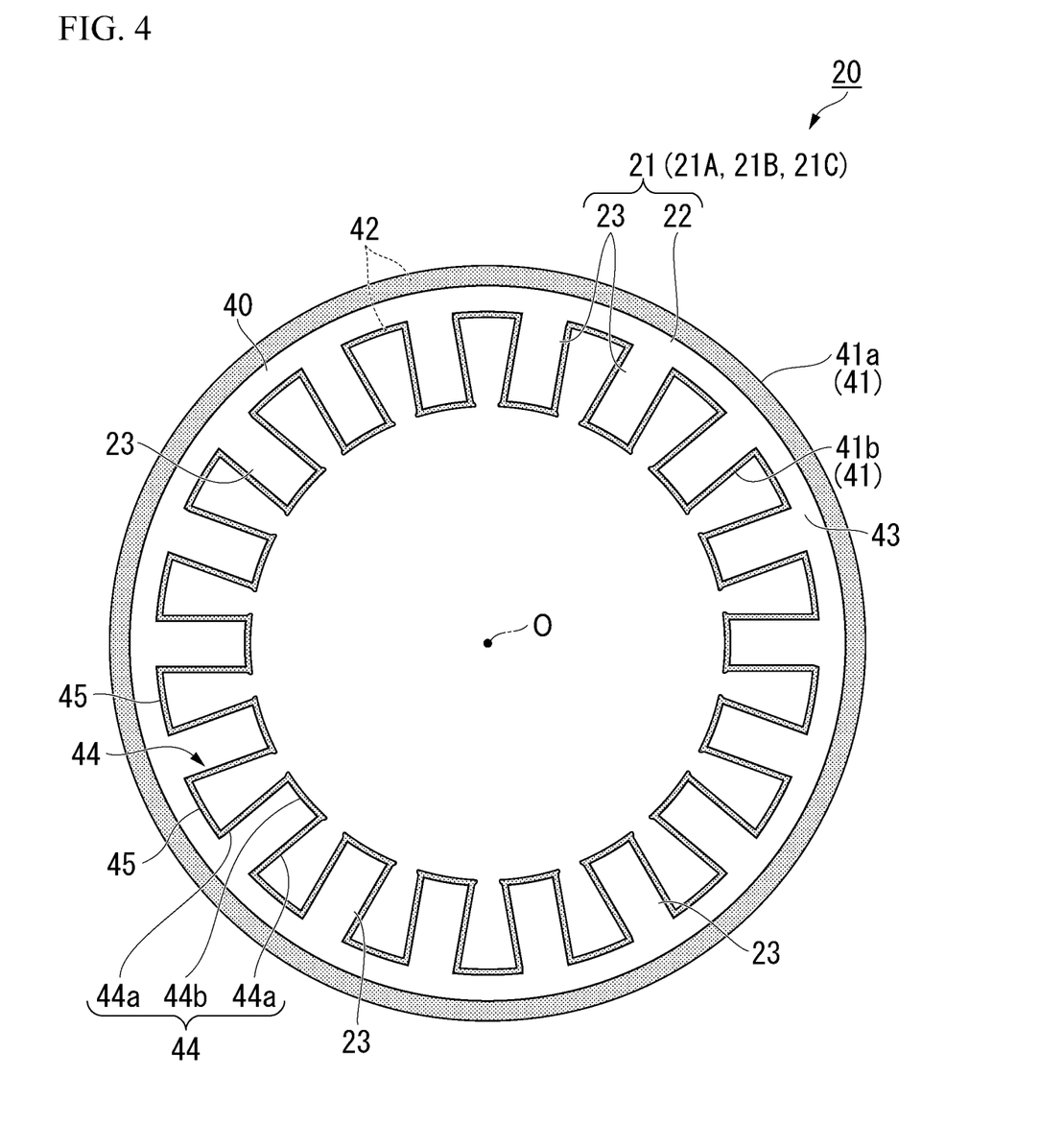
FIG. 4 is a plan view of an electrical steel sheet and an adhesion part of the stator included in the electric motor shown in FIG. 1.

Here, as shown in FIGS. 3 and 4, in the stator core 21 of the present embodiment, all of sets of the electrical steel sheets 40 adjacent in the stacking direction are joined to each other by either adhesion or fastening. In the present embodiment, among the plurality of electrical steel sheets 40, both of N1 electrical steel sheets 40 (hereinafter also referred to as a first laminated body 76) located on a first side D1 in a stacking direction and N2 electrical steel sheets 40 (hereinafter also referred to as a second laminated body 77) located on a second side D2 in the stacking direction are fastened to each other but are not adhered to each other, and furthermore are not joined to each other by a joining method other than the fastening. Among the plurality of electrical steel sheets 40, N3 electrical steel sheets 40 (hereinafter also referred to as a third laminated body 78) located in a center in the stacking direction are adhered to each other but are not fastened to each other, and furthermore are not joined to each other by a joining method other than the adhesion.

Of both ends of the stator core 21 in the stacking direction, an end located on the first side D1 is referred to as a first end portion 21a, and an end located on the second side D2 is referred to as a second end portion 21b. The first end portion 21a is formed of the N1 electrical steel sheets 40 (the first laminated body 76). The second end portion 21b is formed of the N2 electrical steel sheets 40 (the second laminated body 77). In the present embodiment, N1 and N2 are equal. Here, the equality of N1 and N2 includes not only a case in which N1 and N2 are completely equal, but also a case in which there is a slight difference between N1 and N2 (a case in which N1 and N2 are substantially equal). This slight difference means a difference in the number of sheets within 5% with respect to the total number of sheets of the stator core 21.

Figure 5:
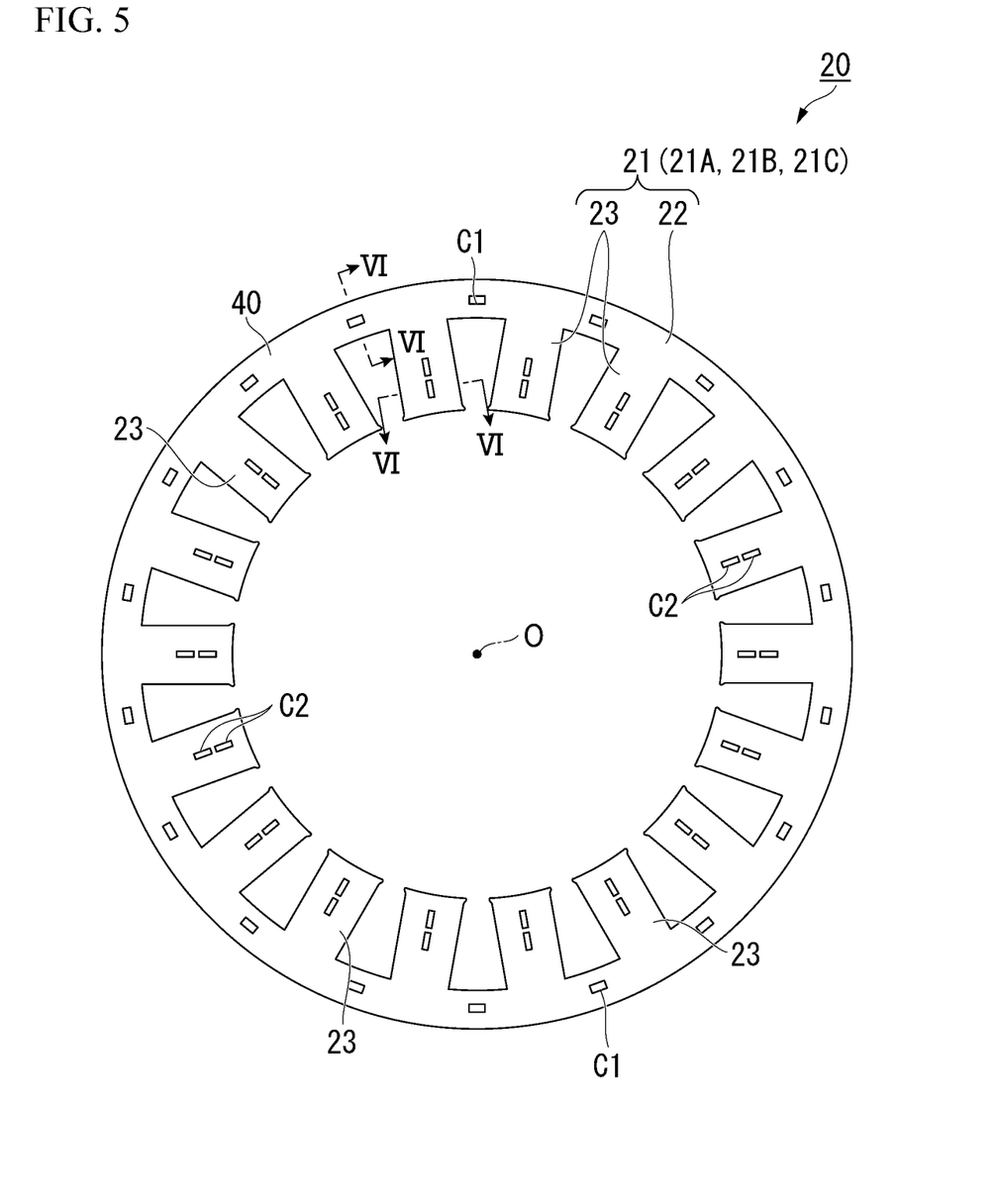
FIG. 5 is a plan view of the electrical steel sheet and fastening parts of the stator included in the electric motor shown in FIG. 1.

As shown in FIG. 5, fastening parts C1 and C2 are formed in the electrical steel sheets 40 (each of the N1 and N2 electrical steel sheets 40, the first laminated body 76 and the second laminated body 77) that are fastened to each other. The fastening parts C1 and C2 include a first fastening part C1 provided in the core back part 22 and a second fastening part C2 provided in each of the tooth parts 23.

A plurality of the first fastening parts C1 are disposed at equal intervals in the circumferential direction. In the illustrated example, the first fastening parts C1 are disposed to be shifted with respect to the tooth parts 23 in the circumferential direction. Each of the first fastening parts C1 is disposed between the tooth parts 23 adjacent in the circumferential direction. The first fastening parts C1 are disposed in a center of the core back part 22 in the radial direction.

The second fastening part C2 is provided in each of all of the tooth parts 23. The second fastening part C2 is disposed in a center of each tooth part 23 in the circumferential direction. Two second fastening parts C2 are disposed in each tooth part 23 side by side in the radial direction.

Figure 6:
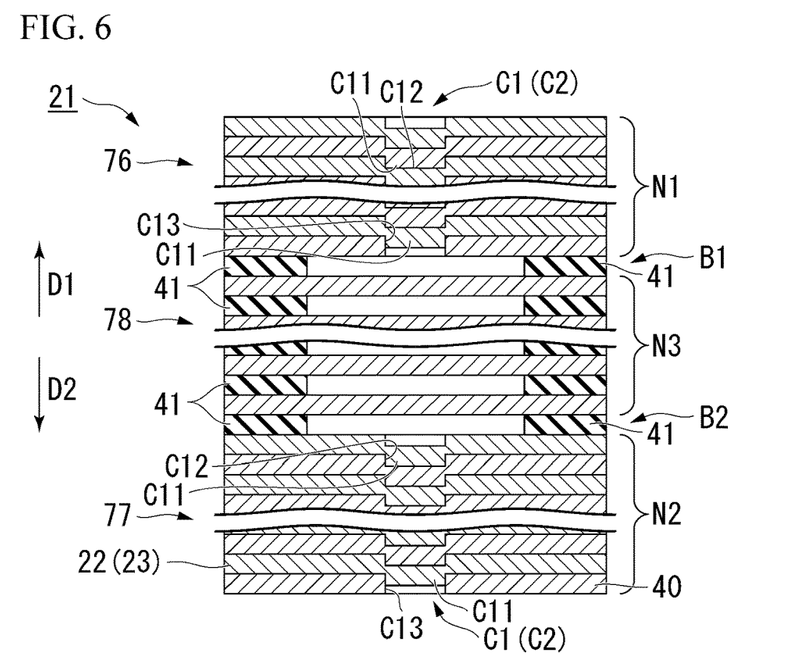
FIG. 6 is a cross-sectional view along line VI-VI shown in FIG. 5.

As shown in FIG. 6, the first fastening part C1 includes a convex part C11 and a concave part C12 which are provided in each electrical steel sheet 40. The convex part C11 protrudes from the electrical steel sheet 40 in the stacking direction. The concave part C12 is disposed in a portion of each electrical steel sheet 40 which is located on a back side of the convex part C11. The concave part C12 is recessed in the stacking direction with respect to the surface (a first surface) of the electrical steel sheet 40. The convex part C11 and the concave part C12 are formed, for example, by a pressing process of each electrical steel sheet 40.

Here, in each of the N1 electrical steel sheets 40 (the first laminated body 76) and the N2 electrical steel sheets 40 (the second laminated body 77), one of the two electrical steel sheets 40 adjacent in the stacking direction is referred to as a first electrical steel sheet 40, and the other is referred to as a second electrical steel sheet 40. The first fastening part C1 is formed by the convex part C11 of the first electrical steel sheet 40 being fitted into the concave part C12 of the second electrical steel sheet 40. When the convex part C11 is fitted into the concave part C12 and the first fastening part C1 is formed, relative displacement between the two electrical steel sheets 40 adjacent in the stacking direction is regulated.

The second fastening part C2 has the same configuration as the first fastening part C1. The second fastening part C2 includes the convex part C11 and the concave part C12 which are provided in each electrical steel sheet 40. The second fastening part C2 is formed by the convex part C11 of the first electrical steel sheet 40 being fitted into the concave part. C12 of the second electrical steel sheet 40. When the convex part C11 is fitted into the concave part C12 and the second fastening part C2 is formed, relative displacement between the two electrical steel sheets 40 adjacent in the stacking direction is regulated.

The shapes of the convex part C11 and the concave part C12 are not particularly limited.

Further, a direction in which the convex part C11 protrudes and a direction in which the concave part C12 is recessed may be either the first side D1 or the second side D2 in the stacking direction.

For example, as in the stator core 21 of the present embodiment shown in FIG. 6, in both of the N1 electrical steel sheets 40 (the first laminated body 76) and the N2 electrical steel sheets 40 (the second laminated body 77), the convex part C11 may protrude to the second side D2, and the concave part C12 may be recessed to the second side D2. In this case, in each of the N1 electrical steel sheets 40 (the first laminated body 76) and the N2 electrical steel sheets 40 (the second laminated body 77), the convex part C11 and the concave part C12 may be formed in the electrical steel sheet 40 located at the most second side D2. However, in the illustrated example, a through hole C13 is formed in the electrical steel sheet 40 located on the most second side D2 instead of the convex part C11 and the concave part C12. In this case, the convex part C11 of the electrical steel sheet 40 adjacent to the electrical steel sheet 40 in which the through hole C13 is formed from the first side D1 is fitted into the through hole C13. Accordingly, in each of the N1 electrical steel sheets 40 (the first laminated body 76) and the N2 electrical steel sheets 40 (the second laminated body 77), two electrical steel sheets 40 located at the most second side D2 are fastened to each other.

Figure 7:
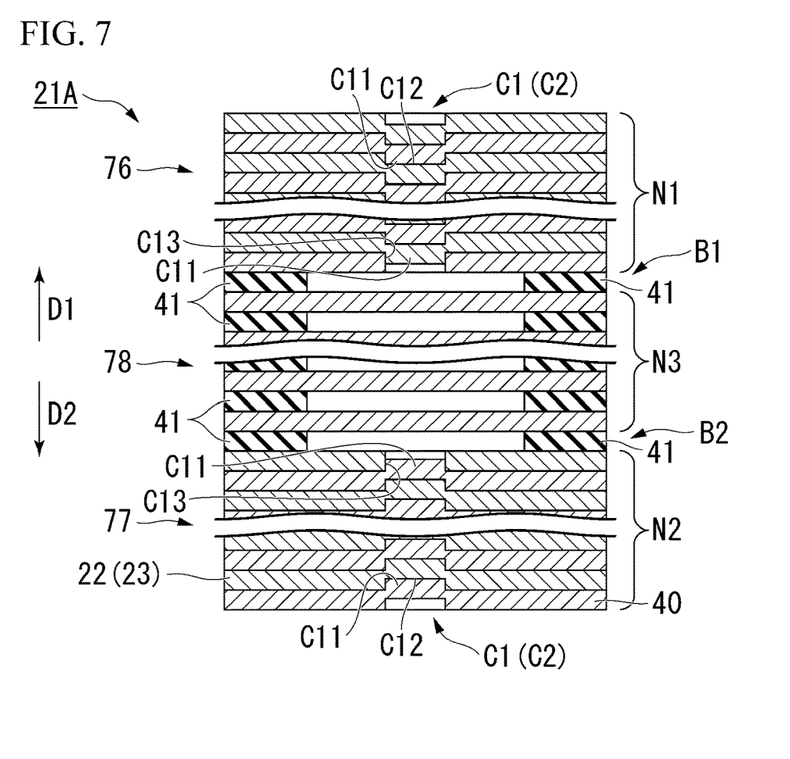
FIG. 7 is a cross-sectional view of a stator core according to a first modification example of the embodiment of the present invention, which corresponds to the cross-sectional view shown in FIG. 6.

Further, for example, as in a stator core 21A of a first modification example shown in FIG. 7, in the N1 electrical steel sheets 40 (the first laminated body 76), the convex part C11 may protrude to the second side D2, and the concave part C12 may be recessed to the second side D2. In addition to this, in the N2 electrical steel sheets 40 (the second laminated body 77), the convex part C11 may protrude to the first side D1, and the concave part C12 may be recessed to the first side D1. In the illustrated example, in the N1 electrical steel sheets 40 (the first laminated body 76), a through hole C13 is formed in the electrical steel sheet 40 located on the most second side D2 instead of the convex part C11 and the concave part C12. Further, in the N2 electrical steel sheets 40 (the second laminated body 77), a through hole C13 is formed in the electrical steel sheet 40 located on the most first side D1 instead of the convex part C11 and the concave part C12.

Figure 8:
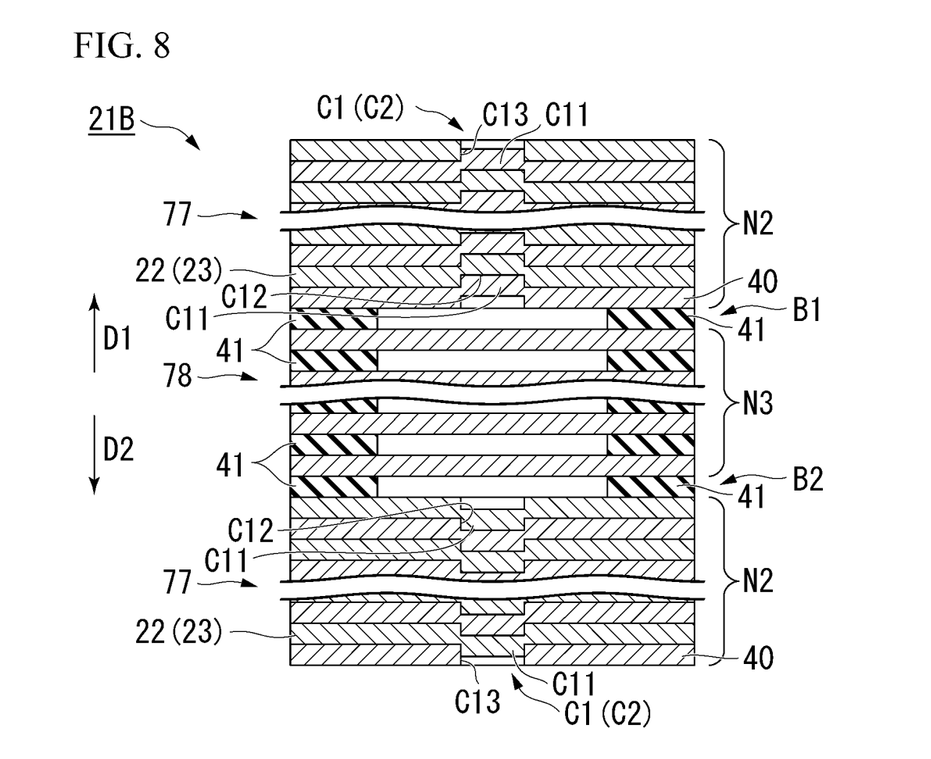
FIG. 8 is a cross-sectional view of a stator core according to a second modification example of the embodiment of the present invention, which corresponds to the cross-sectional view shown in FIG. 6.

Further, for example, as in a stator core 21B of a second modification example shown in FIG. 8, in the N1 electrical steel sheets 40 (the first laminated body 76), the convex part C11 may protrude to the first side D1, and the concave part C12 may be recessed to the first side D1. In addition to this, in the N2 electrical steel sheets 40 (the second laminated body 77), the convex part C11 may protrude to the second side D2, and the concave part C12 may be recessed to the second side D2. In the illustrated example, in the N1 electrical steel sheets 40 (the first laminated body 76), a through hole C13 is formed in the electrical steel sheet 40 located on the most first side D1 instead of the convex part C11 and the concave part C12. Further, in the N2 electrical steel sheets 40 (the second laminated body 77), a through hole C13 is formed in the electrical steel sheet 40 located on the most second side D2 instead of the convex part C11 and the concave part C12.

Although not shown, in both of the N1 electrical steel sheets 40 (the first laminated body 76) and the N2 electrical steel sheets 40 (the second laminated body 77), the convex part C11 may protrude to the first side D1, and the concave part C12 may be recessed to the first side D2.

As shown in FIG. 3, among the plurality of electrical steel sheets 40, the N3 electrical steel sheets 40 (the third laminated body 78) located in a center in the stacking direction are sandwiched from both sides in the stacking direction by the N1 electrical steel sheets 40 (the first laminated body 76) and the N2 electrical steel sheets 40 (the second laminated body 77). The N3 electrical steel sheets 40 (the third laminated body 78) form a central portion 21c of the stator core 21. Assuming that the total number of the electrical steel sheets 40 is NO, NO is obtained as the sum of N1, N2, and N3.

As shown in FIG. 4, the electrical steel sheets 40 adjacent in the stacking direction adhered to each other by the adhesion part 41 are not in whole surface adhesion state. These electrical steel sheets 40 are locally adhered to each other.

In the present embodiment, the electrical steel sheets 40 adjacent in the stacking direction are adhered to each other by the adhesion part 41 provided along a circumferential edge of the electrical steel sheet 40. Specifically, the electrical steel sheets 40 adjacent in the stacking direction are adhered to each other by a first adhesion part 41a and a second adhesion part 41b. The first adhesion part 41a is provided along an outer circumferential edge of the electrical steel sheet 40 in a plan view of the electrical steel sheet 40 in the stacking direction. The second adhesion part 41b is provided along an inner circumferential edge of the electrical steel sheet 40 in a plan view of the electrical steel sheet 40 in the stacking direction. The first and second adhesion parts 41a and 41b are each formed in a band shape in a plan view.

Here, the band shape also includes a shape in which the width of the band changes in the middle. For example, a shape in which round points are continuous in one direction without being divided is also included in the band shape extending in one direction. Further, the term "it is along the circumferential edge" includes not only a case in which it is completely parallel to the circumferential edge but also a case in which it has an inclination of, for example, within 5 degrees with respect to the circumferential edge.

The first adhesion part 41*a* is disposed along the outer circumferential edge of the electrical steel sheet 40. The first adhesion part 41*a* extends continuously over the entire circumference in the circumferential direction. The first adhesion part 41*a* is formed in a circular shape in a plan view of the first adhesion part 41*a* in the stacking direction.

The second adhesion part 41*b* is disposed along the inner circumferential edge of the electrical steel sheet 40. The second adhesion part 41*b* extends continuously over the entire circumference in the circumferential direction.

The second adhesion part 41*b* includes a plurality of tooth portions 44 and a plurality of core back portions 45. The plurality of tooth portions 44 are provided at intervals in the circumferential direction and each tooth portion 44 is disposed in each tooth part 23. The plurality of core back portions 45 are disposed in the core back part 22 and connect the tooth portions 44 adjacent in the circumferential direction to each other.

The tooth portion 44 includes a pair of first portions 44*a* and a second portion 44*b*. The first portions 44*a* are disposed at intervals in the circumferential direction. The first portion 44*a* extends in the radial direction. The first portion 44*a* extends in a band shape in the radial direction. The second portion 44*b* connects the pair of first portions 44*a* to each other in the circumferential direction. The second portion 44*b* extends in a band shape in the circumferential direction.

In the present embodiment, all of the adhesion parts 41 provided between the electrical steel sheets 40 have the same plan view shape. The plan view shape of the adhesion part 41 means the overall shape of the adhesion part 41 in a plan view of the electrical steel sheet 40, in which the adhesion part 41 is provided, in the stacking direction. The matter that all of the adhesion parts 41 provided between the electrical steel sheets 40 have the same plan view shape includes not only a case in which all of the adhesion parts 41 provided between the electrical steel sheets 40 have completely the same plan view shape, but also a case in which all of the adhesion parts 41 provided between the electrical steel sheets 40 have substantially the same plan view shape. The case of substantially the same is a case in which all of the adhesion parts 41 provided between the electrical steel sheets 40 have a common plan view shape of 95% or more.

In the present embodiment, an adhesion area ratio of the electrical steel sheet 40 by the adhesion part 41 is 1% or more and 40% or less. In the illustrated example, the adhesion area ratio is 1% or more and 20% or less, and specifically 20%. The adhesion area ratio of the electrical steel sheet 40 by the adhesion part 41 is a ratio of an area of a region (an adhesion region 42) of the first surface in which the adhesion part 41 is provided with respect to an area of a surface (hereinafter referred to as the first surface of the electrical steel sheet 40) of the electrical steel sheet 40 which faces in the stacking direction. The region in which the adhesion part 41 is provided is a region (the adhesion region 42) of the first surface of the electrical steel sheet 40 in which the adhesive that has cured without being divided is provided. The area of the region in which the adhesion part 41 is provided can be obtained, for example, by photographing the first surface of the electrical steel sheet 40 after peeling and by analyzing an image of the photographed result.

In the present embodiment, between the electrical steel sheets 40, an adhesion area ratio of the electrical steel sheet 40 by the adhesion part 41 is 1% or more and 20% or less. In both electrical steel sheets 40 adjacent in the stacking direction, the adhesion area ratio of the electrical steel sheets 40 by the adhesion part 41 is 1% or more and 20% or less. In a case in which the adhesion part 41 is provided on each of both sides of one electrical steel sheet 40 in the stacking direction, the adhesion area ratio in each of the both sides of the electrical steel sheet 40 is 1% or more and 20% or less.

By adhering the electrical steel sheets 40 to each other by the adhesion part 41, it is possible to easily secure an adhesion area (a joined area) as compared with the case in which the electrical steel sheets 40 are fastened to each other.

In the present embodiment, the electrical steel sheets 40 (each of the N1 and N2 electrical steel sheets 40, the first laminated body 76 and the second laminated body 77) that are fastened to each other are not adhered to each other. In other words, the adhesion part 41 is not provided between the electrical steel sheets 40 that are fastened to each other.

Further, in the present embodiment, the electrical steel sheets 40 (the N3 electrical steel sheets 40) that are adhered to each other are not fastened to each other. In other words, in the electrical steel sheets 40 that are adhered to each other, the convex part C11 and the concave part C12 (or the through hole C13) are not fitted to each other. That is, the regulation of the relative displacement between the electrical steel sheets 40 that are adhered to each other is not realized by at least the fitting between the convex part C11 and the concave part C12 (or the through hole C13).

In the present embodiment, the fastening parts C1 and C2 and the adhesion part 41 are disposed at positions where they do not overlap each other in a plan view and avoid each other. The fastening parts C1 and C2 and the adhesion part 41 are disposed to be shifted from each other in a plan view. The total area of fastening parts C1 and C2 in a plan view is smaller than the total area of the adhesion part 41.

Here, a joining method at a boundary (hereinafter referred to as a first boundary B1) between the N1 electrical steel sheets 40 on the first side D1 which are joined to each other by the fastening and the N3 electrical steel sheets 40 in the center which are joined to each other by the adhesion may be the fastening or may be the adhesion. In other words, the electrical steel sheet 40 located on the most second side D2 among the N1 electrical steel sheets 40 located on the first side D1 and the electrical steel sheet 40 located on the most first side D1 among the N3 electrical steel sheets 40 located in the center may be joined to each other by the fastening or may be joined to each other by the adhesion.

Further, a joining method at a boundary (hereinafter referred to as a second boundary B2) between the N2 electrical steel sheets 40 on the second side D2 which are joined to each other by the fastening and the N3 electrical steel sheets 40 in the center which are joined to each other by the adhesion may be the fastening or may be the adhesion. In other words, the electrical steel sheet 40 located on the most first side D1 among the N2 electrical steel sheets 40 located on the second side D2 and the electrical steel sheet 40 located on the most second side D2 among the N3 electrical steel sheet 40 located in the center may be joined to each other by the fastening or may be joined to each other by the adhesion.

In the stator core 21 shown in FIG. 6, the stator core 21A shown in FIG. 7, and the stator core 21B shown in FIG. 8, the electrical steel sheets 40 adjacent to each other are joined by the adhesion at both the first boundary B1 and the second boundary B2.

Here, one of the electrical steel sheets 40 adjacent to each other at each of the first boundary B1 and the second boundary B2 is referred to as a third electrical steel sheet 40, and the other is referred to as a fourth electrical steel sheet 40. In the third electrical steel sheet 40, the convex part C11, the concave part C12, or the through hole C13 is formed in the surface (the first surface) facing the fourth electrical steel sheet 40. In the fourth electrical steel sheet 40, none of the convex part C11, the concave part C12, and the through hole C13 is formed in the surface (the first surface) facing the third electrical steel sheet 40. The surface of the fourth electrical steel sheet 40 is substantially flat. Here, the matter that the surface is substantially flat includes, for example, a case in which the surface of the electrical steel sheet 40 is formed with an uneven shape that may be unavoidably generated in manufacturing.

In both of the first boundary B1 and the second boundary B2, a case in which the electrical steel sheets 40 are joined to each other is basically main. However, the electrical steel sheets 40 may not be joined at the boundaries B1 and B2 in anticipation of a fastening force due to the winding.

In a case of joining by fastening, it is possible to improve dimensional accuracy as compared with joining by adhesion. Here, among the plurality of electrical steel sheets 40, both of the electrical steel sheets 40 (the N1 electrical steel sheets 40, the first laminated body 76) located on the first side D1 in a stacking direction and the electrical steel sheets 40 (the N2 electrical steel sheets 40, the second laminated body 77) located on the second side D2 in the stacking direction are fastened to each other. Therefore, it is possible to improve the accuracy of the shape of each of portions located on the first side D1 and the second side D2 in the stacking direction (each of portions located outside in the stacking direction with respect to the center in the stacking direction) in the stator core 21. Each of these portions has a large influence on the outer shape of the stator core 21 as compared with a portion located in the center of the stator core 21. Therefore, by increasing the accuracy of the shape of each of these portions, as a result, it is possible to improve the accuracy of the outer shape of the stator core 21. Therefore, it is possible to ensure the handleability of the stator core 21. For example, even in a case in which the winding is wound around the stator core 21, it is possible to wind the winding with high accuracy and the like.

In the present embodiment, when the winding is passed through the slot between the tooth parts 23 adjacent in the circumferential direction, the above-mentioned operational effect of ensuring the handleability is significantly achieved. That is, when the dimensional accuracy of the slot is improved, it is possible to easily wind the winding around the tooth parts 23 as designed. Accordingly, it is possible to increase the space factor of the winding in the slot. As a result, it is possible to increase the electrical load in the slot.

In a case of the joining by the adhesion, it is possible to reduce a strain occurring in the electrical steel sheet 40 as compared with in joining by fastening. Since a strain occurring in the electrical steel sheet 40 affects the iron loss of the electrical steel sheet 40 and the magnetic properties of the stator core 21, the strain is preferably small. Here, among the plurality of electrical steel sheets 40, the electrical steel sheets 40 (the N3 electrical steel sheets 40, the third laminated body 78) located in the center in the stacking direction are adhered to each other. Therefore, it is possible to more suppress the occurrence of a strain as compared with the case in which these electrical steel sheets 40 are fastened to each other. As a result, it is possible to improve the magnetic properties of the stator core 21.

As shown in FIG. 3, N3 is larger than N1 and N2. Therefore, it is possible to reduce a proportion of the number of electrical steel sheets 40 joined by the fastening in the entire stator core 21. As a result, it is possible to further improve the magnetic properties of the stator core 21.

N1 and N2 are equal. Therefore, it is possible to reduce a difference between the dimensional accuracy on the first side D1 in the stacking direction and the dimensional accuracy on the second side D2 in the stacking direction in the stator core 21. Accordingly, it is possible to further ensure the handleability of the stator core 21.

The technical scope of the present invention is not limited to the above-described embodiments, and various modifications can be made without departing from the gist of the present invention.

In the above-described embodiments, the fastening parts C1 and C2 and the adhesion part 41 are disposed at positions where they do not overlap each other in a plan view and avoid each other. However, the fastening parts C1 and C2 and the adhesion part 41 may overlap each other in a plan view.

The shape of the stator core is not limited to the forms shown in the above-described embodiments. Specifically, the dimensions of the outer diameter and the inner diameter of the stator core, the stacking thickness, the number of the slots, the dimensional ratio of each of the tooth parts 23 in the circumferential direction and the radial direction, the dimensional ratio between each of the tooth parts 23 and the core back part 22 in the radial direction, and the like can be arbitrarily designed according to the properties of the desired electric motor.

In the rotor of the above-described embodiments, a set of two permanent magnets 32 form one magnetic pole, but the present invention is not limited to this. For example, one permanent magnet 32 may form one magnetic pole, or three or more permanent magnets 32 may form one magnetic pole.

In the above-described embodiments, the permanent magnetic electric motor has been described as an example of the electric motor, but the structure of the electric motor is not limited to this as will be illustrated below, and as the structure of the electric motor, various known structures that will not be illustrated below can also be adopted.

In the above-described embodiments, the permanent magnetic electric motor has been described as an example of the synchronous motor, however, the present invention is not limited to this. For example, the electric motor may be a reluctance motor or an electromagnet field motor (a wound-field motor).

In the above-described embodiments, the synchronous motor has been described as an example of the AC motor, however, the present invention is not limited to this. For example, the electric motor may be an induction motor.

In the above-described embodiments, the AC motor has been described as an example of the motor, however, the present invention is not limited to this. For example, the electric motor may be a DC motor.

In the above-described embodiments, the motor has been described as an example of the electric motor, however, the present invention is not limited to this. For example, the electric motor may be an electric generator.

In the above-described embodiments, the case in which the laminated core according to the present invention is applied to the stator core has been illustrated, however, the laminated core according to the present invention can also be applied to the rotor core.

In addition, it is possible to appropriately replace the configuration elements in the above-described embodiments with well-known configuration elements without departing from the gist of the present invention, and the above-described modification examples may be appropriately combined.

Next, a verification test was executed to verify the above-mentioned operational effects. The present verification test was executed by a simulation using software. As the software, electromagnetic field simulation software JMAG which is based on a finite element method and is manufactured by JSOL Corporation was used.

As the verification test, a first verification test and a second verification test were executed.

(First Verification Test)

In the first verification test, operational effects based on the fact that the electrical steel sheets on the both sides in the stacking direction are fastened to each other, and the electrical steel sheets in the center in the stacking direction are adhered to each other were verified.

In this verification test, simulations were executed for stators of Comparative Examples 1 and 2 and a stator of Example 1.

To be common to both the stators of Comparative Examples 1 and 2 and the stator of Example 1, the stator 20 according to the embodiment shown in FIGS. 1 to 6 was used as a basic structure, and the following points were changed with respect to the stator 20. That is, the thickness of the electrical steel sheet was set to 0.25 mm, the stacking thickness of the laminated core was set to 50 mm, and the number of electrical steel sheets was set to 200.

Then, in the stator of Comparative Example 1, 200 electrical steel sheets were joined to each other by the fastening in all of layers. In the stator of Comparative Example 2, 200 electrical steel sheets were joined to each other by the adhesion in all of layers. In the stator of Example 1, among 200 electrical steel sheets, each 30 sheets (each 15% of the total number of sheets) located on the both sides in the stacking direction were joined to each other by the fastening, and 140 sheets (70% of the total number of sheets) located in the center in the stacking direction were joined to each other by the adhesion.

For each of the stators of Comparative Examples 1 and 2 and Example 1, the iron loss per electrical steel sheet and the dimensional accuracy as the stator core were confirmed. The iron loss was calculated by a simulation using the above software. The dimensional accuracy was evaluated with the amount of deviation from the target size in a case in which five stator cores were manufactured in each example.

The results are shown in Table 1 below.

TABLE 1

|  | Comparative Example 1 | Example 1 | Comparative Example 2 |
|---|---|---|---|
| Joining method | All layers fastening | Both sides fastening and center adhesion | All layers adhesion |
| Iron loss (w/kg) | 27.4 | 25.0 | 24.0 |
| Dimensional accuracy | Excellent | Favorable | Poor |

From the above, in Example 1, an improvement in the iron loss of 8.8% (=(27.4−25.0)/27.4) was observed, and a favorable result was obtained regarding the dimensional accuracy as compared with Comparative Example 1.

(Second Verification Test)

In the second verification test, the difference in effects based on the difference in the number of sheets fastened to each other and the number of sheets adhered to each other was verified.

In this verification test, simulations were executed for stators of Examples 11 to 14.

To be common to both the stators of Examples 11 to 14, the stator 20 according to the embodiment shown in FIGS. 1 to 6 was used as a basic structure, and the following points were changed with respect to the stator 20. That is, the thickness of the electrical steel sheet was set to 0.25 mm, the stacking thickness of the laminated core was set to 50 mm, and the number of electrical steel sheets was set to 200.

Then, the stators of Examples 11 to 14 were set as follows.

In the stator of Example 11, among 200 electrical steel sheets, each 20 sheets (each 10% of the total number of sheets) located on the both sides in the stacking direction were joined to each other by the fastening, and 160 sheets (80% of the total number of sheets) located in the center in the stacking direction were joined to each other by the adhesion.

In the stator of Example 12, among 200 electrical steel sheets, each 40 sheets (each 20% of the total number of sheets) located on the both sides in the stacking direction were joined to each other by the fastening, and 120 sheets (60% of the total number of sheets) located in the center in the stacking direction were joined to each other by the adhesion.

In the stator of Example 13, among 200 electrical steel sheets, each 60 sheets (each 30% of the total number of sheets) located on the both sides in the stacking direction were joined to each other by the fastening, and 80 sheets (40% of the total number of sheets) located in the center in the stacking direction were joined to each other by the adhesion.

In the stator of Example 14, among 200 electrical steel sheets, each 80 sheets (each 40% of the total number of sheets) located on the both sides in the stacking direction were joined to each other by the fastening, and 40 sheets (20% of the total number of sheets) located in the center in the stacking direction were joined to each other by the adhesion.

The results are shown in Table 2 below.

TABLE 2

|  | Example 11 | Example 12 | Example 13 | Example 14 |
|---|---|---|---|---|
| Ratio of fastening (one side) | 10% | 20% | 30% | 40% |
| Ratio of adhesion | 80% | 60% | 40% | 20% |
| Iron loss (w/kg) | 24.7 | 25.4 | 26.0 | 26.7 |
| Dimensional accuracy | Possible | Favorable | Favorable | Favorable |

From the above, it was confirmed that the iron loss was improved from Example 14 toward Example 11. For example, in Example 11, an improvement in the iron loss of 7.5% (=(26.7−24.7)/26.7) was observed as compared with Example 14. For example, in Example 12, an improvement in the iron loss of 4.9% (=(26.7−25.4)/26.7) was observed as compared with Example 14.

On the other hand, in Examples 12 to 14, favorable results were obtained regarding the dimensional accuracy.

From the results, it was confirmed that it is preferable that the number N1 of the electrical steel sheets (the first laminated body) located on the first side in the stacking direction and fastened to each other, the number N2 of the electrical steel sheets (the second laminated body) located on the second side in the stacking direction and fastened to each other, and the number N0 of the whole electrical steel sheets have the following relationship. That is, it was confirmed that it is preferable that the ratios (N1/N0 and N2/N0) of N1 and N2 to N0 are preferably 10% or more and 40% or less when N1 and N2 are equal (N1=N2). Furthermore, it was confirmed that it is more preferable that each of the above ratios is 20% or more and 40% or less.

INDUSTRIAL APPLICABILITY

According to the present invention, it is possible to improve the magnetic properties while ensuring dimensional accuracy of an outer shape. Therefore, the industrial applicability is great.

BRIEF DESCRIPTION OF THE REFERENCE SYMBOLS

10 Electric motor
21, 21A, 21B Stator core (laminated core)
22 Core back part
23 Tooth part
40 Electrical steel sheet

The invention claimed is:

1. A laminated core comprising a plurality of electrical steel sheets stacked on each other,
wherein, among the plurality of electrical steel sheets, both of the electrical steel sheets located on a first side in a stacking direction and the electrical steel sheets located on a second side in the stacking direction are fastened to each other but are not adhered to each other, and the electrical steel sheets located in a center in the stacking direction are adhered to each other by an adhesive but are not fastened to each other, wherein the adhesive forms adhesion parts, and
wherein a number N1 of the electrical steel sheets located on the first side in the stacking direction and fastened to each other, a number N2 of the electrical steel sheets located on the second side in the stacking direction and fastened to each other, and a number N0 of the whole electrical steel sheets have the following relationships: each of N1/N0 and N2/N0 are 15% or more and 40% or less.

2. The laminated core according to claim 1, wherein a number N3 of the electrical steel sheets located in the center and adhered to each other is larger than both the number N1 of the electrical steel sheets located on the first side and fastened to each other and the number N2 of the electrical steel sheets located on the second side and fastened to each other.

3. The laminated core according to claim 1, wherein the number N1 of the electrical steel sheets located on the first side and fastened to each other is equal to the number N2 of the electrical steel sheets located on the second side and fastened to each other.

4. The laminated core according to claim 1, wherein each of the electrical steel sheets includes an annular core back part and a plurality of tooth parts that protrude from the core back part in a radial direction of the core back part and are disposed at intervals in a circumferential direction of the core back part.

5. The laminated core according to claim 1, wherein an average thickness of the adhesion parts is 1.0 μm to 3.0 μm.

6. The laminated core according to claim 1, wherein an average tensile modulus of elasticity E of the adhesion parts is 1500 MPa to 4500 MPa.

7. The laminated core according to claim 1, wherein the adhesive is a room temperature adhesion type acrylic-based adhesive including SGA made of an elastomer-containing acrylic-based adhesive.

8. An electric motor comprising the laminated core according to claim 1.

* * * * *